Aug. 25, 1953 P. J. PIECZONKA 2,650,355
SIGNAL DEVICE ASSOCIATED WITH WINDSHIELD WIPER
Filed Dec. 29, 1949
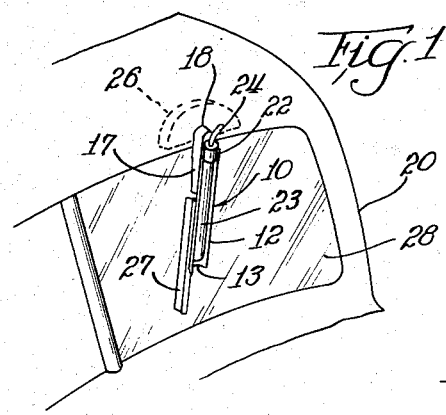
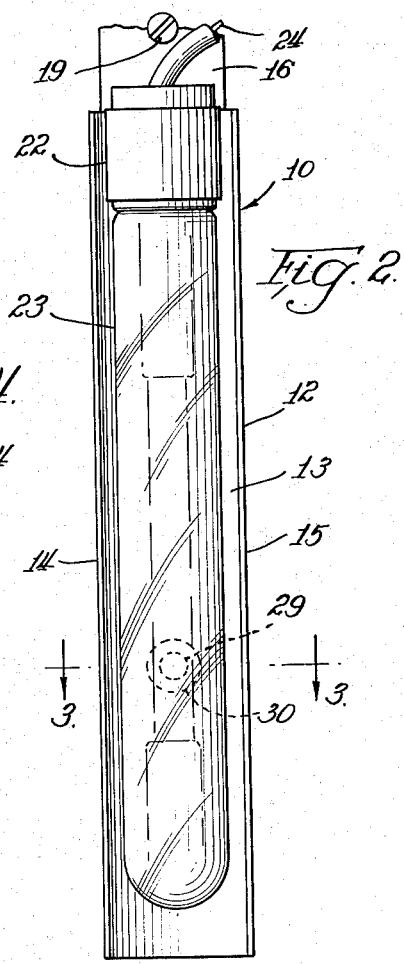
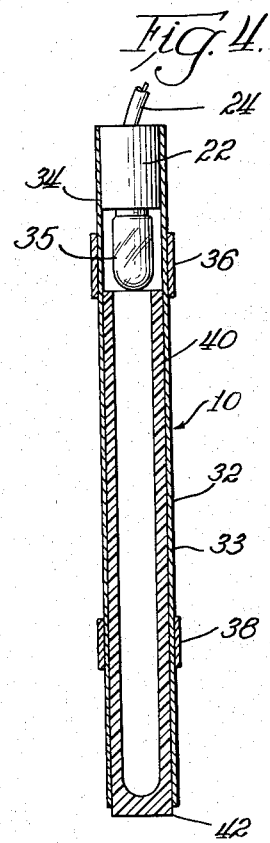
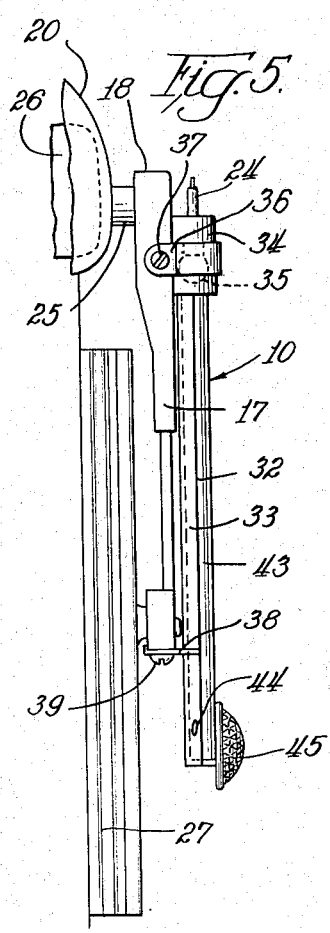
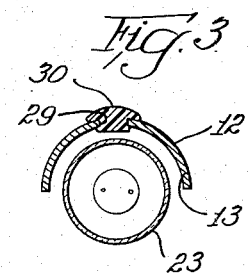
INVENTOR.
Peter J. Pieczonka
BY Albert G. McCaleb
Atty.

Patented Aug. 25, 1953

2,650,355

UNITED STATES PATENT OFFICE 2,650,355

SIGNAL DEVICE ASSOCIATED WITH
WINDSHIELD WIPER

Peter Joseph Pieczonka, Chicago, Ill.

Application December 29, 1949, Serial No. 135,781

8 Claims. (Cl. 340—136)

This invention relates to signal devices, and more particularly to such devices for use on vehicles and adapted to the provision of a visual signal.

One of the general objects of my invention is to provide a visual signal device adapted to use on a windshield wiper arm or other prominently placed and selectively movable part which is normally present on a vehicle.

As another object, this invention provides a signal particularly suited to use in bad weather as a warning to pedestrians and people in other vehicles that the vehicle upon which it is used is in operation.

My invention further has within its purview the provision of a signal light and reflector unit adapted to convenient installation on a vehicle at a position which is prominently visible to persons in front of the vehicle, and which makes use of the attention demanding qualities of illumination and motion.

It is a further feature of my signal device that it operates without distraction to the operator of the vehicle upon which it is used, and while serving as a prominent signal, it does not detrimentally distract or annoy those who observe it.

I have provided, as a safety factor on my preferred signal device structure, a tell-tale indication serving the operator of the vehicle upon which it is used to give an indication that the signal device is in operation.

As a further safety factor, as well as to serve as a secondary signal, my invention comprehends the provision of a reflective element in my signal device which is adapted to reflect light from the headlights of oncoming vehicles.

It is another object of my invention to provide a moving signal for vehicles which is actuated by a vacuum motor, of the type commonly used for windshield wipers, whereby the speed of movement and frequency of back and forth movements gives some indication of whether the car on which it is used is accelerating or decelerating.

Other objects and advantages of the invention will be apparent from the following description and the accompanying drawings in which similar characters of reference indicate similar parts throughout the several views.

Referring to the one sheet of drawings:

Fig. 1 is a fragmentary perspective view depicting the adaptation of a preferred form of my signal device to the windshield wiper of a motor vehicle;

Fig. 2 is a front elevational view of a preferred embodiment of my signal device;

Fig. 3 is a sectional view illustrating a detail of the structure of the signal device of Fig. 2, and wherein the section is taken substantially on a line 3—3 of Fig. 2;

Fig. 4 is a front elevational view, partially in section, illustrating a modification in the structure of my signal device; and Fig. 5 is a fragmentary side elevational view, drawn to a larger scale than Fig. 1, depicting the adaptation of another modified form of my signal device to the windshield wiper of a motor vehicle.

In illustrative embodiments of my invention which are shown in the accompanying drawings, I have depicted forms thereof which are each suited to use on motor vehicles, such as passenger cars and trucks, as well as upon airplanes, locomotives and the like. By the application of my signal device to the windshield wiper of such a vehicle, advantage is taken, without detriment to the operation of the windshield wiper, of the motive means of that generally used accessory and the attention demanding motion of the signal device which is thereby provided. The structure of the signal device is such that it is adapted to serve its purpose without providing interference or annoyance to the driver of the vehicle upon which it is used. Furthermore, when utilized upon a windshield wiper or accessory which is driven by an air motor from the vacuum system of a motor vehicle, the rate of motion or a change in the rate of motion provides an indication to the driver of an approaching vehicle or to a pedestrian, which indication is additional to that provided by the mere fact of the motion. That is, slow motion and a slow rate of reversal of the reciprocating motion indicate possible acceleration of the oncoming vehicle, while rapid motion and rapid reversal of the motion of the signal device provides some indication of an approach at high speed or decelerating movement of the oncoming vehicle. In any instance, the use of the signal device on a windshield wiper provides an indication of possible poor vision and the desirability of action, which indications can be enhanced by the flashing of the signal light.

In the form shown in Figs. 1, 2 and 3, my signal device 10 embodies an elongated sheet metal shield 12 having a light reflective front surface 13, which shield is preferably of substantially semi-cylindrical lateral section, so as to have forwardly extending side portions 14 and 15. At one end of the shield 12, a mounting bracket 16 is secured thereto, by which the signal device is held in place relative to an arm 17 of a windshield wiper 18 with the aid of fastening means, such as a screw 19. The signal device, thus mounted, extends along the outer surface of the arm and faces forwardly of a vehicle 20, as depicted in Figs. 1 and 5.

Also at one end of the front surface of the shield 12, a light socket 22 is mounted to be carried thereby and so as to support an electric light bulb 23 adjacent the concavely curved reflective surface 13 of the shield. In the form shown in Figs. 1, 2 and 3, the electric light bulb 23 is long and narrow; the length of the bulb being several times its diameter, so that the bulb extends along a major portion of the length of the shield. It is to be noted, however, that the bulb does not extend beyond the ends of the shield and lies partially within the concave curvature of the shield, so as to throw the light from the bulb forwardly and prevent it from casting any glare to the operator of the vehicle upon which it is mounted.

In the adaptation to mounting upon a windshield wiper, as depicted in Figs. 1 and 5, the socket 22 is preferably mounted at the end of the arm 17 adjacent the axis of swinging movement of that arm. With this arrangement, an insulated flexible lead wire 24 through which battery current is supplied to the light bulb, is subjected to a minimum amount of movement. In the installation depicted, the wiper arm 17 is supported by and actuated through a shaft 25 which extends from a wiper actuating motor 26, which motor may be an air motor operated from the vacuum system of the vehicle. At the end of the wiper arm 17 opposite the shaft 25, a wiper blade 21 is carried for reciprocating or swinging movement across the surface of a windshield 28.

While it is desirable to provide effective shielding for the light bulb, so as to prevent undesirable reflections or direct light from causing any annoyance to the operator of the vehicle upon which the signal device is used, it is also desirable to provide a tell-tale signal to indicate to the operator of the vehicle that the signal device is in operation. For thus purpose, I have provided a small hole 29 in the shield 12, as depicted in Figs. 2 and 3, through which a very small amount of light from the bulb 23 will be visible to the vehicle operator. In order to reduce the intensity of the light passing through the opening 29, a colored jewel 30 of a transparent plastic material or the like is mounted in the opening, as illustrated in Fig. 3.

In the modified forms of my signal device 10 which are depicted in Figs. 4 and 5, a shield 32 has an elongated semi-cylindrical portion 33, at one end of which is a cylindrical portion 34 which carries the light socket 22 and serves as a shield for a small light bulb 35. A bracket 36 is secured to the cylindrical portion 34 of the shield and is adapted to be secured to the wiper arm 17 by fastening means such as a screw 37, as shown in Fig. 5. Also, a second bracket 38 may be secured to the semi-cylindrical portion of the shield, to be secured to the extending end of the arm 17 by fastening means, such as a screw 39.

In the form of my invention depicted in Fig. 4, a tubular transparent member 40 of glass or plastic material and having a cylindrical outer surface is secured in and extends along the full length of the semi-cyclindrical portion 33 of the shield 32. At one end, the end margin of the tubular transparent member is overlapped by the cylindrical portion 34 of the housing to effect completion of a closure adjacent the socket and light bulb. The other end of the tubular transparent member 40 is closed and has a portion 42 extending a short distance beyond the end of the semi-cylindrical portion 33 of the shield to serve as a tell-tale indicator which will glow when the light bulb is lit.

In the modified form of my invention which is depicted in Fig. 5, a rod 43 of a transparent material, such as plastic, has a cylindrical outer surface and fits into the semi-cylindrical portion 33 of the shield. This rod, as in the instance of the form shown in Fig. 4, has an end marginal portion overlapped by the cylindrical portion 34 of the shield. With this structure, the rod will glow when the light is lit. For providing the tell-tale indicator in this instance, however, I have provided one or more holes, such as 44, in the semi-cylindrical portion of the shield, through which the glow of the rod may be observed as an indicator that the light is lit.

In the form depicted in Fig. 5, a jewel type reflector 45 is secured to the extending end of the shield 32 to reflect light from the headlights of an approaching vehicle or the like, thereby providing an indicating signal which is adapted to function in addition to the glow provided from the light bulb 35, and which will operate in case of the failure of the light bulb. It is to be understood that the jewel type reflector may be utilized with any or all of the forms of my signal device herein depicted.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. A signal device adapted to be carried by the arm of a windshield wiper or the like for oscillating movement therewith and comprising, in combination, a substantially semi-cylindrical metal reflector which is axially elongated and has a light reflective and concave front surface, a mounting bracket secured to and projecting from the reflector, a socket for an electric light secured to one end of the front surface of the reflector for carrying an electric light bulb partially within the concave surface contour of the reflector, and means for providing a tell-tale indication of low intensity at the rear of the reflector and from the illumination of said light bulb to show that the bulb is lit.

2. A signal device as defined in claim 1, and wherein said means for providing a tell-tale indication comprises a small hole in the reflector.

3. A signal device as defined in claim 1, and further characterized by a cylindrical element of transparent material having one end adjacent the light bulb and said cylindrical element fitting in and extending axially along the front surface of the reflector.

4. A signal device as defined in claim 3, and wherein said cylindrical element extends a short distance beyond the end of the reflector to provide the tell-tale indication.

5. A signal dvice as defined in claim 1, and further characterized by a jewel type light reflective element carried by the reflector and facing in the same direction as the front surface of the reflector.

6. A signal device as defined in claim 1, and further characterized by an externally cylindrical element of transparent material extending along the concave front surface of the reflector and having one end adjacent the light bulb, and said cylindrical element comprising a rod of plastic material.

7. A signal device as defined in claim 1, and further characterized by an externally cylindrical element of transparent material extending along the concave front surface of the reflector and having one end adjacent the light bulb, and said cylindrical element comprising a hollow tube having the end remote from the light bulb closed.

8. A signal device as defined in claim 1, and wherein said light bulb extends substantially the full length of the reflector, and means providing a tell-tale indication comprising a small hole in the mid-portion of the reflector.

PETER JOSEPH PIECZONKA.

References Cited in the file of this patent

UNITED STATES PATENTS

| Number | Name | Date |
|---|---|---|
| 1,319,265 | Brown | Oct. 21, 1919 |
| 1,879,057 | Bray | Sept. 27, 1932 |
| 2,307,372 | Hubbs | Jan. 5, 1943 |
| 2,387,953 | Terry | Oct. 30, 1945 |
| 2,506,330 | Badgett | May 2, 1950 |